United States Patent
Hamada

(10) Patent No.: US 9,887,395 B2
(45) Date of Patent: Feb. 6, 2018

(54) SECONDARY CELL

(71) Applicant: NGK INSULATORS, LTD., Nagoya (JP)

(72) Inventor: Hideyuki Hamada, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 37 days.

(21) Appl. No.: 15/053,202

(22) Filed: Feb. 25, 2016

(65) Prior Publication Data

US 2016/0172637 A1   Jun. 16, 2016

Related U.S. Application Data

(63) Continuation of application No. PCT/JP2014/071432, filed on Aug. 14, 2014.

(30) Foreign Application Priority Data

Aug. 30, 2013  (JP) ................................. 2013-180637

(51) Int. Cl.
| | | |
|---|---|---|
| H01M 2/02 | (2006.01) | |
| H01M 2/10 | (2006.01) | |
| H01M 2/04 | (2006.01) | |
| H01M 10/39 | (2006.01) | |

(52) U.S. Cl.
CPC ......... *H01M 2/029* (2013.01); *H01M 2/0252* (2013.01); *H01M 2/04* (2013.01); *H01M 2/043* (2013.01); *H01M 2/0404* (2013.01); *H01M 2/1094* (2013.01); *H01M 2/1088* (2013.01); *H01M 10/3909* (2013.01)

(58) Field of Classification Search
CPC .......... H01M 10/0525; H01M 2/0277
See application file for complete search history.

(56) References Cited

U.S. PATENT DOCUMENTS

| 6,465,123 B1 | 10/2002 | Baumann et al. | |
|---|---|---|---|
| 2005/0151514 A1* | 7/2005 | Kozu | H01M 2/0404 320/147 |
| 2010/0209750 A1* | 8/2010 | Nagamatsu | H01M 2/0262 429/94 |

FOREIGN PATENT DOCUMENTS

| CN | 202395065 U | 8/2012 |
|---|---|---|
| DE | 199 30 399 A1 | 1/2001 |
| EP | 2 541 668 A1 | 1/2013 |
| JP | 03-155058 A1 | 7/1991 |
| JP | 04-010956 U | 1/1992 |

(Continued)

OTHER PUBLICATIONS

International Search Report and Written Opinion (Application No. PCT/JP2014/071432) dated Oct. 7, 2014.

(Continued)

*Primary Examiner* — Olatunji Godo
(74) *Attorney, Agent, or Firm* — Burr & Brown, PLLC

(57) ABSTRACT

This secondary battery includes a tubular battery body and a cover member containing the battery body. The cover member includes a tubular body at least covering a side surface of the battery body and a bottom which at least part of a bottom surface of the battery body contacts. The bottom includes an expansion expanded in a direction away from the bottom surface of the battery body, and an end surface of the expansion contacts the insulating plate. The area of the end surface of the expansion is smaller than the area of the bottom surface of the battery body.

17 Claims, 17 Drawing Sheets

(56) References Cited

FOREIGN PATENT DOCUMENTS

| | | |
|---|---|---|
| JP | 2002-164081 A1 | 6/2002 |
| JP | 2003-234131 A1 | 8/2003 |

OTHER PUBLICATIONS

Japanese Office Action (Application No. 2015-534136) dated Dec. 20, 2016 (with English translation).
Extended European Search Report, European Application No. 14840172.2, dated Mar. 27, 2017 (8 pages).

* cited by examiner

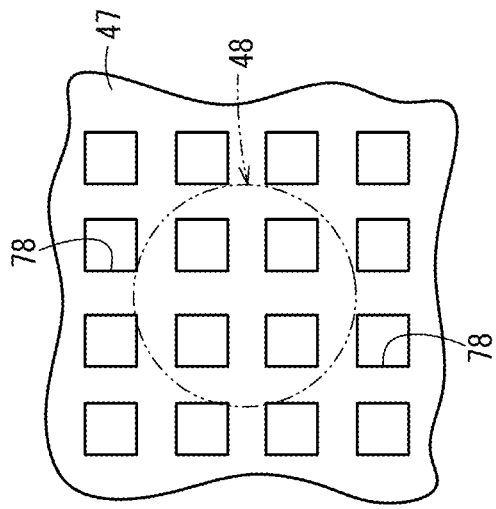
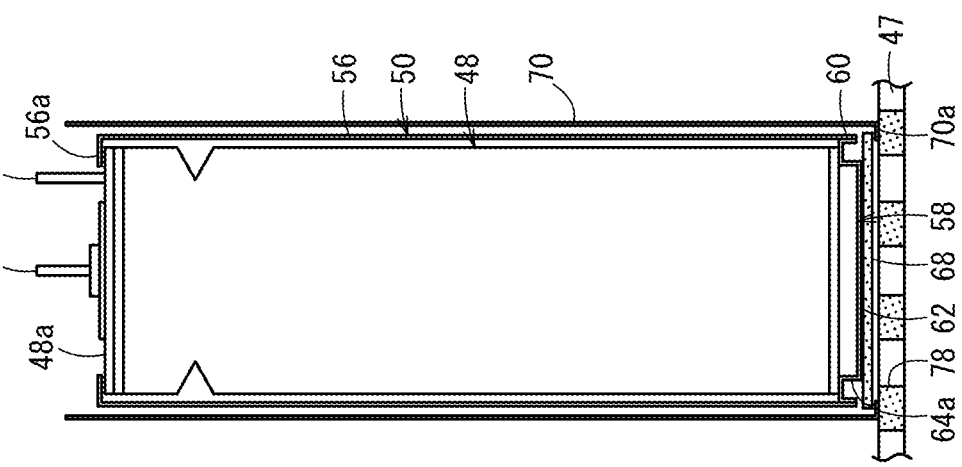
FIG. 16B
FIG. 16A

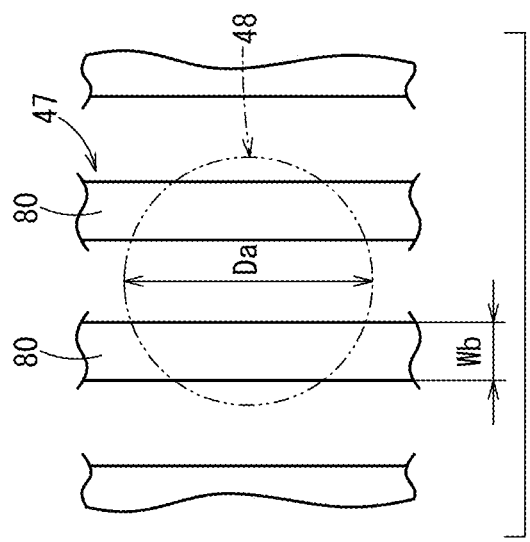
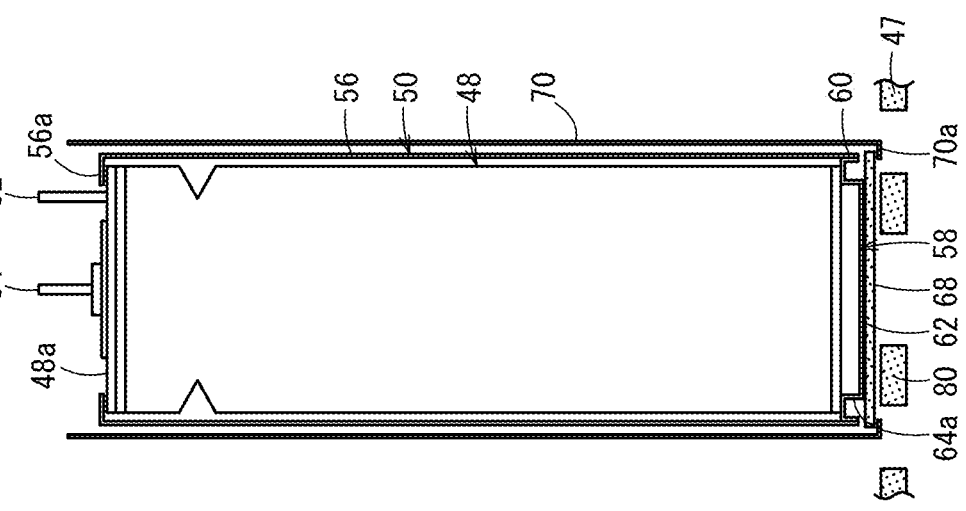

SECONDARY CELL

CROSS-REFERENCE TO RELATED APPLICATIONS

This application is a Continuation of International Application No. PCT/JP2014/071432 filed on Aug. 14, 2014, which is based upon and claims the benefit of priority from Japanese Patent Application No. 2013-180637 filed on Aug. 30, 2013, the contents all of which are incorporated herein by reference.

BACKGROUND OF THE INVENTION

1. Field of the Invention

The present invention relates to a secondary cell (secondary battery) suitable for ensuring the desired insulation resistance of a battery assembly, e.g., formed by arranging a large number of secondary batteries.

2. Description of Related Art

As a secondary battery, a sodium-sulfur battery (hereinafter referred to as the NaS battery) is used, for example. This NaS battery is a high temperature secondary battery containing metal sodium and sulfur as active materials in an isolated manner using a solid electrolyte pipe. When the NaS battery is heated at high temperature of about 300° C., a certain amount of energy is produced by an electrochemical reaction of both of the melted active materials of these metal sodium and sulfur. Normally, the NaS battery is formed by assembling a plurality of battery cells upright, and used in a form of a battery assembly (module) including a plurality of battery cells connected together. That is, the battery assembly has structure where circuits (strings) each formed by connecting a plurality of battery cells in series are connected in parallel to form a block, at least two blocks are connected in series to form a battery assembly, and the battery assembly is placed in a battery assembly container.

In use of the NaS battery, a plurality of heat insulating containers are stacked in the vertical direction using fixed metal racks (frames) to form one module string, and a plurality of module strings are arranged in a lateral direction to form one electric power storage apparatus (secondary battery system).

In this regard, in use of the NaS battery, etc., a certain level of insulating performance from the ground needs to be achieved. For example, the insulation proof test according to the rules for power generation/transformation requires "No degradation in the insulating performance after applying the direct current voltage at the maximum working voltage of the battery×1.5 for 10 minutes." Further, in the measurement of the insulation resistance values, it is required to "Use a 500V or 1000V insulation resistance meter having a one-minute value of 0.4 MΩ or more."

In view of this point, conventionally in order to ensure the insulation resistance value mentioned above, a ceramic or mica flat plate is attached to a portion around a battery cell or an inner surface of a side wall of a case (see Japanese Laid-Open Utility Model Publication No. 4-010956), or a battery assembly is electrically insulated from a fixed rack (see Japanese Laid-Open Patent Publication No. 2002-164081). Further, in another example proposed to have other structures, fire proof material in the form of particles filled in a gap between a heat insulating container and a battery cell, a side surface mica cover wound around the battery cell to cover the entire side surface of the battery cell, and a bottom surface mica cover wound around the battery cell to cover the entire bottom surface of the battery cell are provided (see specification of Chinese Utility Model Application No. 201120527662.6).

SUMMARY OF THE INVENTION

In the case of constructing the secondary battery system, as described above, a plurality of modules are combined together. In this case, since each of the frames is connected to the earth (ground: GND), an equivalent circuit is insulating resistors for respective modules are connected in parallel, between the modules and the earth. In the structure, the insulation resistance is low in comparison with the case where one module is present. Therefore, if it is desirable to increase the number of modules connected to the secondary battery system, it is required to increase the insulation resistance of each module.

For this purpose, it may be considered to increase the number of flat plates of, e.g., ceramic or mica provided between the battery assembly and the container, or increase the thickness of the flat plates. However, these ideas lead to problems that the size of the container, especially the height of the container, is increased, and cracks tend to occur easily in the mica during operation undesirably (see the specification of Chinese Utility Model Application No. 201120527662.6).

The present invention has been made taking the problems of this type into account, and an object of the present invention is to provide a secondary battery which makes it possible to improve the insulation resistance of each battery cell, increase the insulation resistance of each module without increasing the number and the thickness of insulating members of, e.g., mica, and increases the number of modules connected to the secondary battery system.

[1] A secondary battery according to the present invention includes a metal container, a plurality of insulating sheets stacked on a bottom surface of the container, and a battery cell placed on the insulation sheet. At least one of the following relationships is satisfied:

$$Aa > Ab$$

$$Aa > Ac$$

where Aa denotes a projection area of the battery cell projected on the bottom surface of the container, Ab denotes a contact area Ab between the battery cell and the insulating sheet, and Ac denotes a contact area between the insulating sheets in the projection area.

In the structure, it is possible improve the insulation resistance of each battery cell, and increase the insulation resistance of the battery assembly formed by combining a large number of secondary battery cells without increasing the number and the thickness of the insulating sheets. Therefore, when a plurality of battery assemblies are connected in series to form a secondary battery system, the insulation resistance between the secondary battery system and the ground is increased. Consequently, it becomes possible to increase the number of connected battery assemblies while maintaining the electric power at the same level.

[2] In this case, the battery cell may include a tubular battery body and a cover member containing the battery body, the cover member may include a tubular body at least covering a side surface of the battery body and a bottom which contacts at least part of a bottom surface of the battery body, and the bottom may contact an insulating sheet in the uppermost layer separated for each battery cell, among the plurality of insulating sheets.

[3] Preferably, the bottom includes an expansion expanded in a direction away from the bottom surface of the battery body, and an end surface of the expansion contacts the insulating sheet in the uppermost layer, and the area of the end surface of the expansion is smaller than the area of the bottom surface of the battery body. By adopting this structure, the above relationship of Aa>Ab is satisfied.

For example, the insulation resistance between the secondary battery and the earth is considered. When the case where the insulating plate contacts the bottom surface is compared with the case where the insulating sheet contacts the end surface of the expansion at the bottom of the cover member, since the area of the end surface of the expansion is smaller than the area of the bottom surface the battery body, the case where the insulating sheet contacts the end surface of the expansion has the larger insulation resistance, and the insulation resistance of the battery assembly formed by combining a large number of secondary batteries is increased. Therefore, when a plurality of battery assemblies are connected in series to form one secondary battery system, the insulation resistance between the secondary battery system and the earth is increased. Consequently, it becomes possible to increase the number of connected battery assemblies while maintaining the electric power at the same level.

That is, it is possible to increase the insulation resistance of each battery assembly without increasing the number and the thickness of the insulating sheets such as mica sheets, and increases the number of battery assemblies connected to the secondary battery system.

[4] In the present invention, at least one step may be formed in a surface of the expansion facing the bottom surface of the battery body. In this manner, it is possible to decrease the area of the portion of end surface of the expansion which contacts the insulating plate, and further increase the contact resistance between the secondary battery and the earth.

[5] In this case, the step may extend in a direction in which the expansion is expanded.

[6] Alternatively, the step may extend in a direction opposite to the direction in which the expansion is expanded.

[7] In the present invention, at least one protrusion may be formed in a surface of the expansion facing the bottom surface of the battery body. In this case, since the entire end surface of the expansion does not contact the insulating plate, but the end surface of the protrusion contacts the insulating plate, it is possible to reduce the area of the contact with the insulating plate, and further increase the insulation resistance between the secondary battery and the ground.

Further, since the insulating plate directly contacts the end surface of the protrusion provided in the expansion, and the expansion functions as a buffer member (suspension member), even if vibrations occurs in the frame or the housing supporting the battery assembly, almost all the vibrations are cancelled at the expansion, and are not transmitted directly to the battery body. Consequently, improvement in the reliability of the secondary battery is achieved.

Further, since the contact area between the expansion and the insulating plate becomes small, the stress applied to the insulating plate is increased. However, the stress is dispersed in the insulating plate. The stress is applied to the mica sheet, etc. at the lower position not as the concentrated load, but as the distributed load. Therefore, breakage (cracks) does not occur easily in the mica sheet, etc.

[8] In this case, the protrusion may protrude in a direction in which the expansion is expanded.

[9] Alternatively, the protrusion may protrude in a direction opposite to the direction in which the expansion is expanded.

[10] In the present invention, the cover member may include a joint portion at which the tubular body and the bottom are joined together, the joint portion may extend in an axial direction of the battery body away from the bottom surface of the battery body, and the end surface of the joint portion may be present between a position corresponding to the bottom surface of the battery body and a position corresponding to the end surface of the expansion. In the structure, since the joint portion at least has a certain length, the joint portion can be joined securely by welding, etc. Further, since the contact between an insulating plate and the joint portion is avoided, it is possible to prevent the decrease in the insulation resistance by the contact between the joint portion and the insulating plate.

[11] In this case, an outer shape of the insulating sheet (insulating plate) in the uppermost layer which contacts the end surface of the expansion may substantially match the outer shape of the end surface of the joint portion. In the structure, the insulating plate can be provided to face the entire end surface of the expansion, and the insulating plate can reliably contact the entire end surface of the protrusion.

[12] In the invention, in addition to the insulating sheet in the uppermost layer which contacts the end surface of the expansion, the secondary battery may include a tubular insulating member covering the tubular body of the cover member and an outer circumferential portion of the insulating sheet. In the structure, in the case where a plurality of battery bodies are provided in parallel, the desired electric insulation between the battery bodies is achieved.

[13] In the present invention, a lower end of the tubular member may be bent inward at a lower position of the insulating sheet in the uppermost layer, and the inner diameter at the lower end of the tubular insulating member may be smaller than the outer diameter of the insulating sheet. In the structure, the lower end of the insulating member is sandwiched between the insulating sheet and another insulating material (e.g., mica sheet). Therefore, it is possible to prevent the tubular insulating member from being detached from the battery cell, or occurrence of unwinding. It is a matter of course that the lower end of the insulating member contributes to the increase of the insulation resistance.

[14] In the present invention, the insulating sheet in the uppermost layer may have one or more through holes.

[15] Alternatively, the insulating sheet in the uppermost layer may be formed by arranging a plurality of band shaped sheets each having a width smaller than the outer diameter of the battery cell.

Also in the structure noted in these items [14] and [15], the above described relationship Aa>Ab may be satisfied.

[16] In the present invention, at least one insulating sheet which is present below the insulating sheet in the uppermost layer, among the plurality of insulating sheets, may have a plurality of through holes.

[17] Alternatively, at least one insulating sheet which is present below the insulating sheet in the uppermost layer, among the plurality of insulating sheets, may be formed by arranging a plurality of band shaped sheets each having a width smaller than the outer diameter of the battery cell.

In the structure noted in these items [16] and [17], the above described relationship Aa>Ab may be satisfied.

In the secondary battery according to the present invention, it is possible to improve the insulation resistance of each secondary battery, increase the insulation resistance of each module without increasing the number and the thickness of insulating members of, e.g., mica, and increases the number of modules connected to a secondary battery system.

BRIEF DESCRIPTION OF DRAWINGS

FIG. 16A is a view showing structure of a secondary battery according to a fourth modified example, with a cover member, an insulating plate, and an insulating member taken away;

FIG. 16B is a plan view showing a mica sheet (in a grid pattern), as viewed from a top surface;

FIG. 17A is a view showing structure of a secondary battery according to a fifth modified example, with a cover member, an insulating plate, and an insulating member taken away;

FIG. 17B is a plan view showing a mica sheet (having a band shape), as viewed from a top surface;

DETAILED DESCRIPTION OF THE INVENTION

Hereinafter, an embodiment of a secondary battery according to the present invention, e.g., applied to a NaS battery will be described with reference to FIGS. 1 to 17B.

Figure 1:
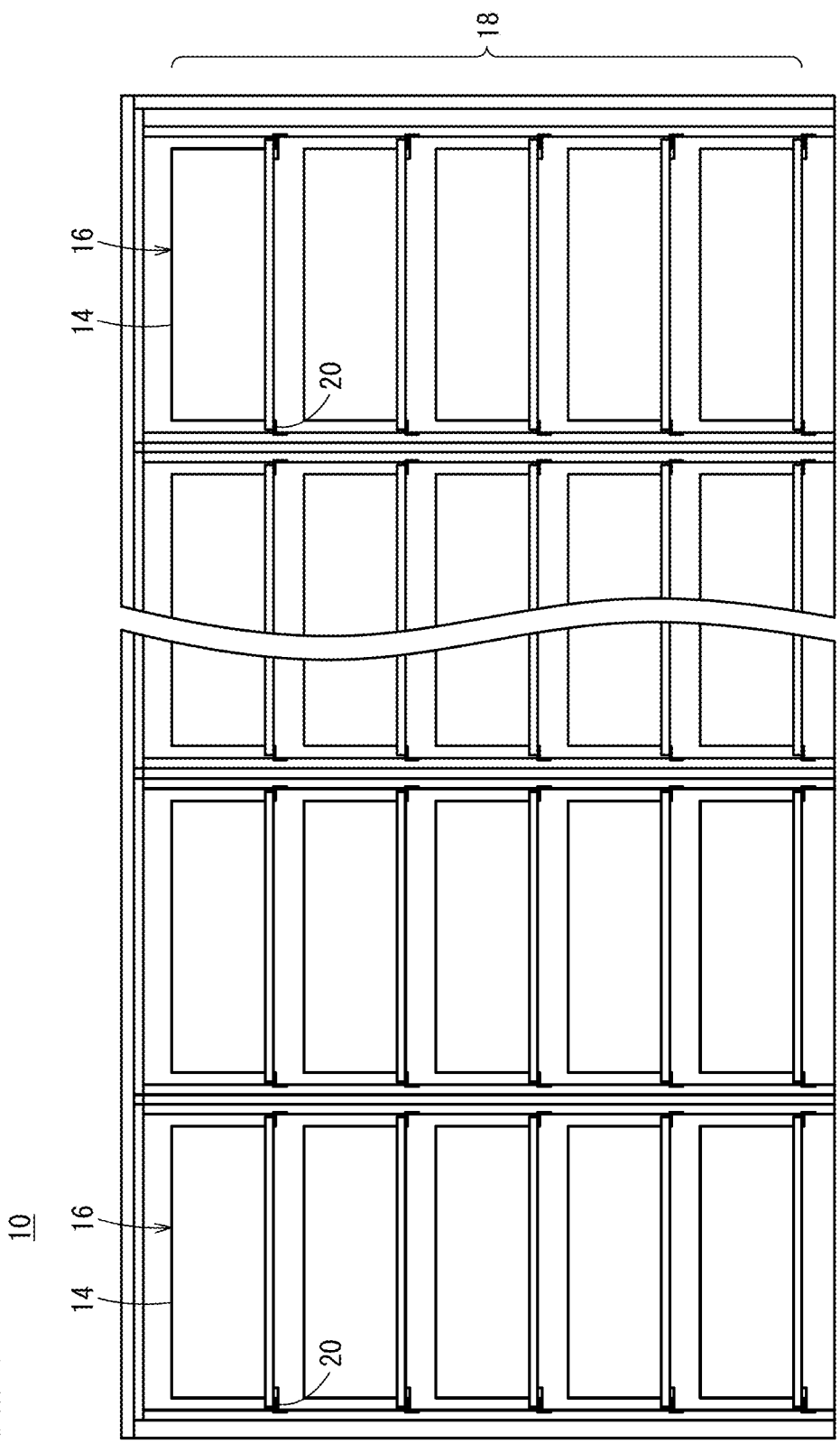
FIG. 1 is a front view showing an example of a secondary battery system to which a secondary battery according to an embodiment of the present invention is applied.

Firstly, as shown in FIG. 1, a secondary battery system 10 to which the secondary battery according to the embodiment of the present invention is applied includes two or more modules 16 each containing a large number of battery cells 12 (see FIG. 2A) placed in a housing 14.

Specifically, in the embodiment of the present invention, two or more module strings 18 are provided. Each of the module strings 18 is formed by connecting a predetermined number of (five, in the example of FIG. 1) modules 16 in series. Each of the modules 16 is provided on a corresponding frame 20. The secondary battery according to the embodiment of the present invention may refer to the battery cell 12 only, or may refer to the module 16, the module string 18, or the secondary battery system 10.

Figure 2A:
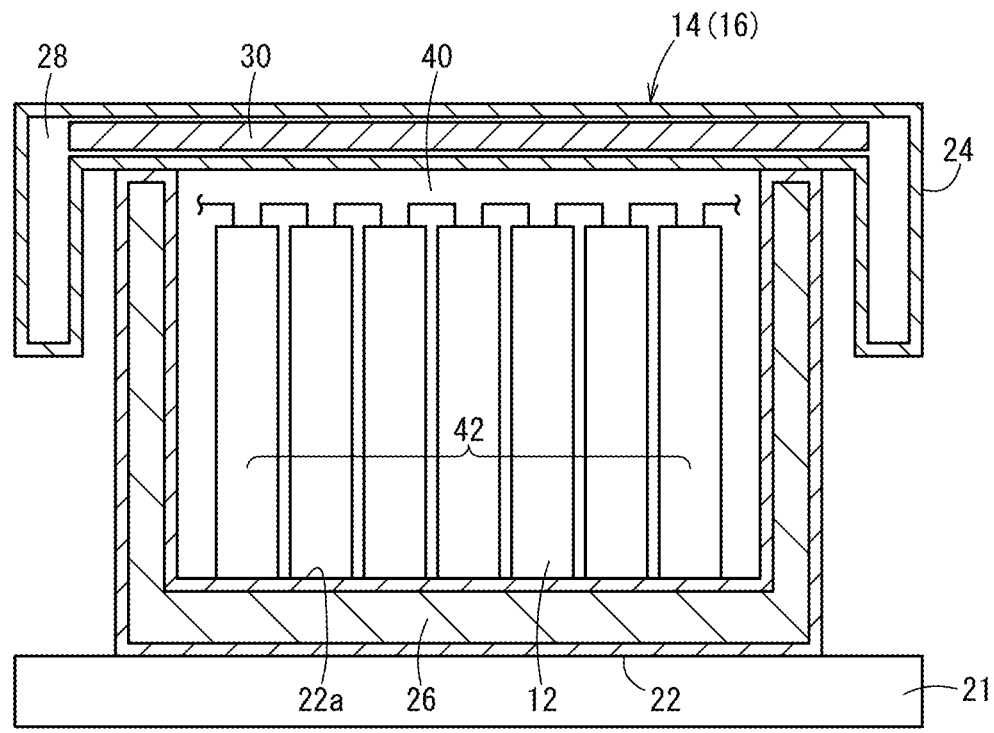
FIG. 2A is a cross sectional view showing structure of a module.
Figure 2B:
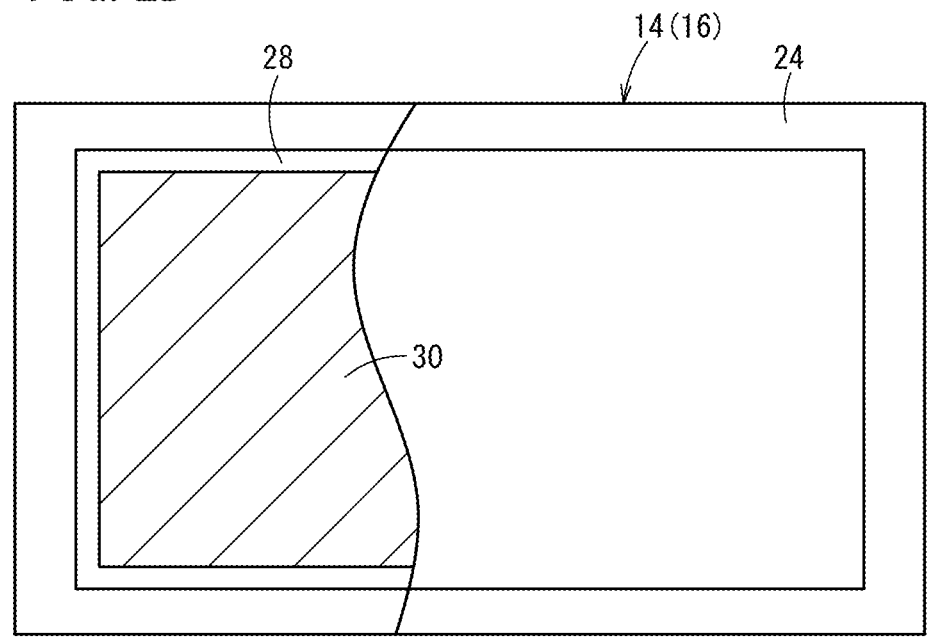
FIG. 2B is a top view showing the structure of the module with parts taken away.

Next, structure of the module 16, in particular, structure of the housing 14 will be described with reference to FIGS. 2A and 2B.

The housing 14 is a heat insulating container. For example, the housing 14 includes a base frame 21 made of steel material, a box body 22 having an opening at its upper surface, and placed fixedly on the base frame 21, and a lid body 24 for closing the opening of the box body 22.

For example, the box body 22 is made of plate material of stainless steel. The box body 22 is formed in a box shape having a hollow area. The hollow area is a hermetical space which is sealed hermetically. The hollow area is connectable to the external space by a vacuum valve (not shown). A vacuum heat insulating board 26 formed by solidifying glass fiber into a plate shape using adhesive is porous and loaded in the hollow area to achieve vacuum heat insulating structure of the box body 22.

In the same manner as in the case of the box body 22, the lid body 24 is formed of a plate member of, e.g., stainless steel. A heat insulating material layer for achieving the required minimum heat insulating property is placed on an inner surface (lower surface) of the lid body 24, and at least two stacked detachable heat insulating plates 30 are filled (stacked) in a hollow area 28 to provide air heat insulating structure only for the lid body 24 (upper surface). In the structure, the amount of heat radiation from the upper surface of the housing 14 can be controlled.

Though not shown, for example, components such as a buffer, a heater, a heat equalizing plate, a mica sheet (insulating sheet) for electrical insulation are stacked together, and placed on a bottom surface 22a of the box body 22. The heater is also placed on a side surface of the box body 22.

One battery assembly 42 formed by a large number of battery cells 12 is placed upright in the internal space 40 of the housing 14, the internal space 40 being formed by the box body 22 and the lid body 24. In order to suppress damages, abnormal heating of the battery cells 12, leakage of active material, etc., though not shown, as fire extinction sand, silica sand is filled in a gap between the box body 22 and the battery assembly 42.

Figure 3:
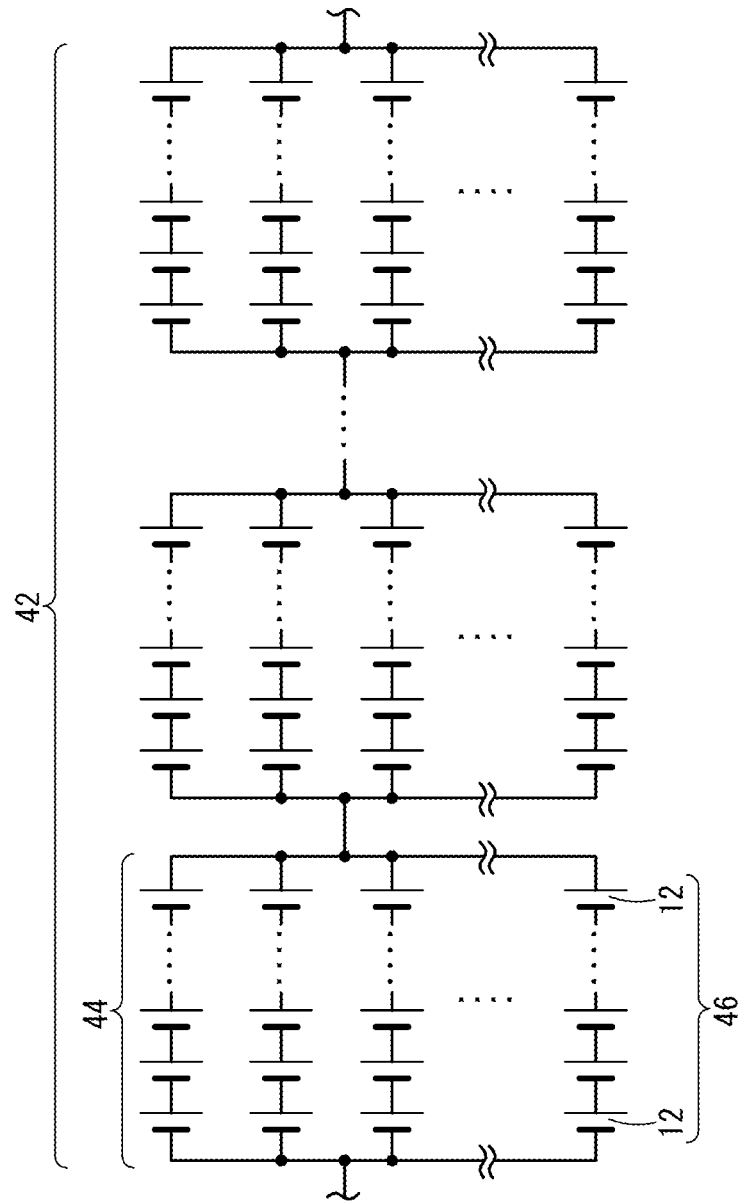
FIG. 3 is an equivalent circuit diagram showing a battery assembly included in the module.

As shown in FIG. 3, the battery assembly 42 is formed by connecting a plurality of blocks 44 in series. Each of the blocks 44 is formed by connecting a plurality of circuits (strings 46) in parallel, and each of the strings 46 is formed by connecting a plurality of battery cells 12 in series.

Figure 4:
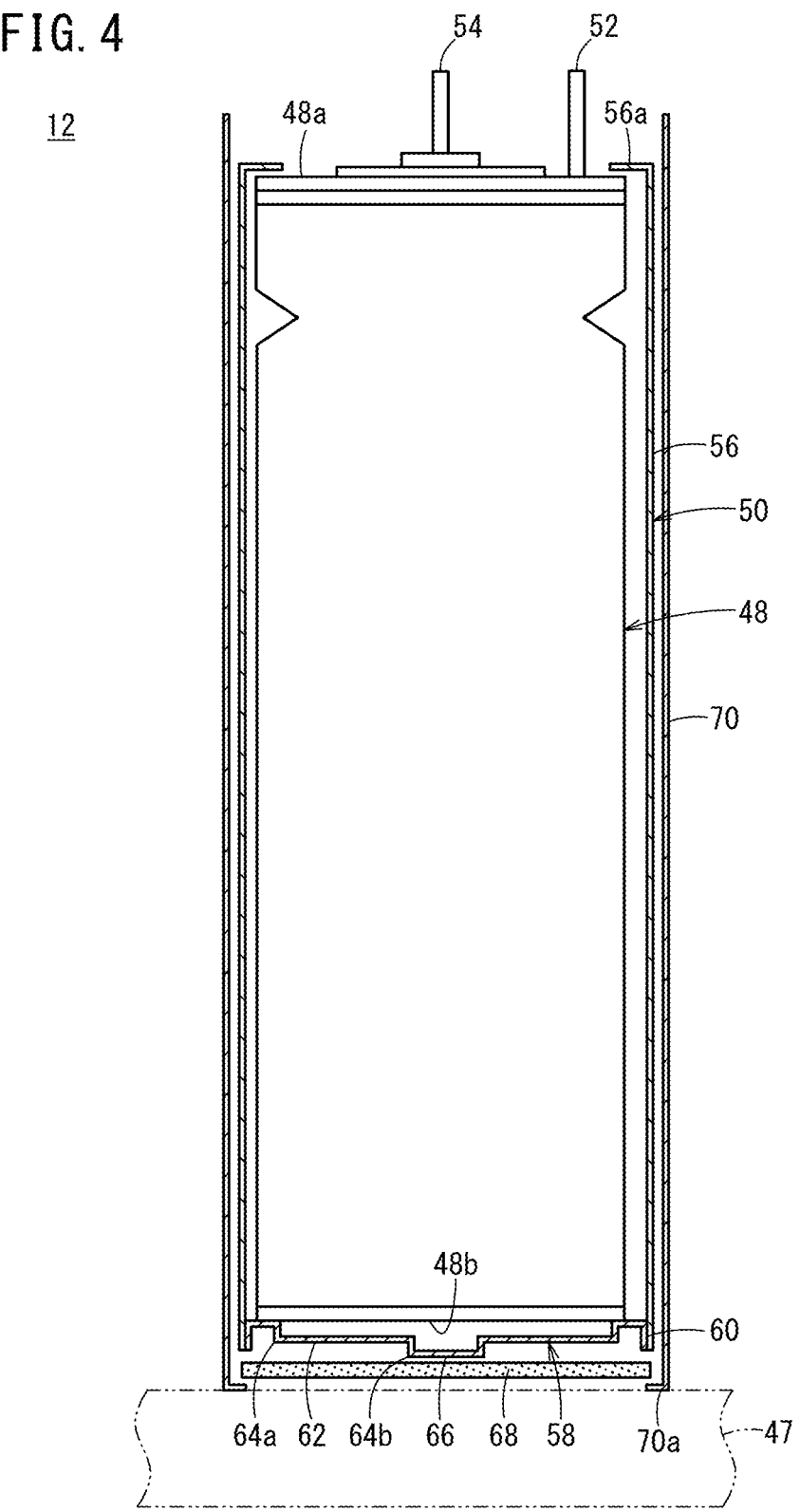
FIG. 4 is a view showing structure of a battery cell according to the embodiment of the present invention, with a cover member, an insulating plate, and an insulating member taken away.

Further, as shown in FIG. 4, each of the unit cells 12 is placed on a mica sheet 47, and includes a battery body 48 and a metal cover member 50 containing the battery body 48.

The battery body 48 has a tubular shape (e.g., cylindrical shape). A positive terminal 52 is attached to a peripheral portion of an upper surface 48a, and a negative terminal 54 is attached to a central portion of the upper surface 48a.

The cover member 50 includes a tubular body 56 covering at least a side surface of the battery body 48, a bottom 58 which at least a part of the bottom surface 48b of the battery body 48 contacts, and a joint portion 60 where the tubular body 56 and the bottom 58 are joined each other, e.g., by welding. The joint portion 60 extends in an axial direction of the battery body 48 away from the bottom surface 48b of the battery body 48.

The upper end 56a of the tubular body 56 is bent inward, and the battery body 48 is vertically sandwiched between this upper end 56a and the bottom 58. That is, the cover member 50 has a function of suppressing expansion of the battery body 48 in the axial direction.

Figure 5A:
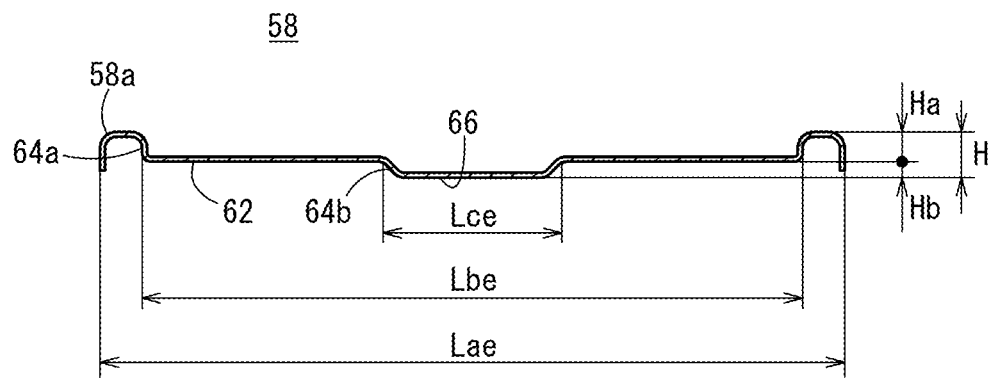
FIG. 5A is a cross sectional view showing a bottom of a cover member according to the embodiment of the present invention.
Figure 5B:
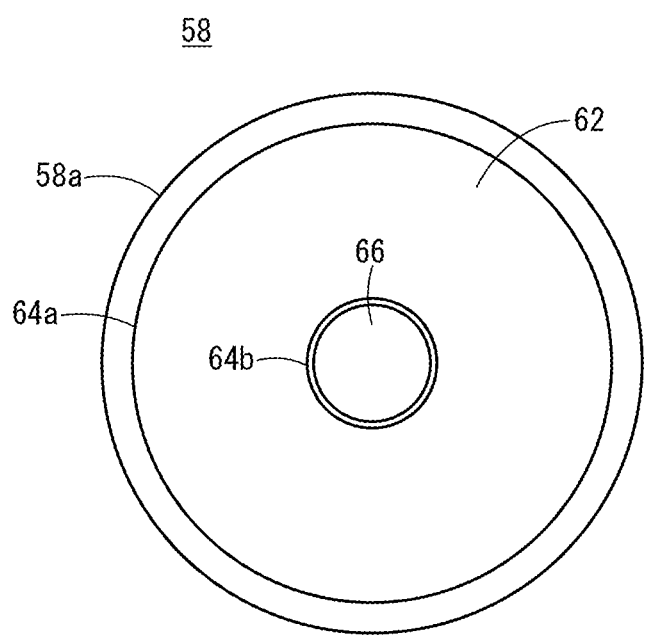
FIG. 5B is a plan view showing the bottom of the cover member, as viewed from a top surface.

Then, as shown in FIGS. 4, 5A, and 5B, the bottom 58 of the cover member 50 has an expansion 62 expanded in a direction away from the bottom surface 48b of the battery body 48. That is, the outer circumferential portion 58a of the bottom 58 is deformed (bent) toward the bottom surface 48b of the battery body 48 in an inverted U-shape in cross section. The outer end of this outer circumferential portion 58a, is joined to a lower end of the tubular body 56 to form a joint portion 60, and inner portion of this outer circumferential portion 58a forms a first step 64a of the expansion 62. In the structure, the area of the bottom surface 48b of the battery body 48 is larger than the area of the end surface of the expansion 62.

The expansion 62 includes at least one protrusion 66 on its surface facing the bottom surface 48b of the battery body 48. In an example of FIG. 4, one protrusion 66 is formed at a central part of the expansion 62. The side wall portion of this protrusion 66 forms a second step 64b of the expansion 62. As shown in FIG. 5B, the surface shape of the protrusion 66 may have a circular, triangular, or a quadrangular shape. It is a matter of course that the surface shape of the protrusion 66 may have a polygonal shape, such as a pentagonal, hexagonal or octagonal shape, or a star shape.

An example of the dimensional relationship among the bottom 58, the expansion 62, and the protrusion 66 of the cover member 50 will be described. The outer diameter Lae of the bottom 58 shown in FIG. 5A is in a range of 80 to 100 mm. The ratio of the outer diameter Lbe of the expansion 62 to the outer diameter Lae of the bottom 58 (Lbe/Lae) is, e.g., in a range of 7.5/9 to 8.5/9. The ratio of the outer diameter Lce of the protrusion 66 to the outer diameter Lbe of the expansion 62 (Lce/Lbe) is, e.g., in a range of 1.5/8 to 2.5/8. Further, the height H from the upper end of the bottom 58 to the end surface of the protrusion 66 is in a range of 6 to 8 mm. The ratio of the size Ha of the first step 64a to the height H of the first step 64a (Ha/H) is, e.g., in a range of 2.5/7 to 3.5/7). The ratio of the size Hb of the second step 64b to the height H (Hb/H) is, e.g., in a range of 3.5/7 to 4.5/7. The ratios of these various dimensions may be changed as necessary depending on the electric power of the battery cell 12, the electric power of the module 16, and the electric power of the secondary battery system 10.

As shown in FIG. 4, the end surface of the above joint portion 60 is present between a position corresponding to the bottom surface 48b of the battery body 48 and a position corresponding to the end surface of the expansion 62. In an example of FIG. 4, the end surface of the joint portion 60 is located at a position corresponding to the portion of the second step 64b of the expansion 62. In the structure, since the joint portion 60 can have a certain length, the joint portion 60 can be joined securely by welding, etc. Further, since the contact between an insulating plate 68 described later and the joint portion 60 is avoided, it is possible to prevent the decrease in the insulation resistance due to the contact between the joint portion 60 and the insulating plate 68.

Further, in the embodiment of the present invention, the insulating plate 68 (insulating sheet) made of, e.g., mica which contacts the end surface of the expansion 62 (end surface of the protrusion 66 in the example of FIG. 4) and the tubular insulating member 70 made of, e.g., mica which covers the tubular body 56 of the cover member 50 and the outer circumferential portion of the insulating plate 68 are provided. In the structure, electrical insulation between the plurality of battery bodies 48 provided in parallel is achieved. In this case, the outer shape of the insulating plate 68 substantially matches the outer shape of the end surface of the joint portion 60. The expression "substantially match" herein may refer to the completely matching shape, and additionally, may refer to a shape (similar shape, etc.) which varies from the completely matching shape in a range of ±1 mm. Therefore, the insulating plate 68 can be provided to face the entire end surface of the expansion 62, and the insulating plate 68 can reliably contact the entire end surface of the protrusion 66.

The lower end 70a of the tubular insulating member 70 is bent inward at a lower position of the insulating plate 68, and the inner diameter at the lower end 70a of the tubular insulating member 70 is smaller than the outer diameter of the insulating plate 68. In the structure, the lower end 70a of the insulating member 70 is sandwiched between the insulating plate 68 and the mica sheet 47. It is possible to prevent the tubular insulating member 70 from being detached from the battery cell 12, or from unwinding. It is a matter of course that the lower end 70a of the insulating member 70 also contributes to the increase in the insulation resistance.

The advantages of providing the protrusion 66 in the expansion 62 will be described with reference to FIGS. 6 to 8B.

Figure 6:
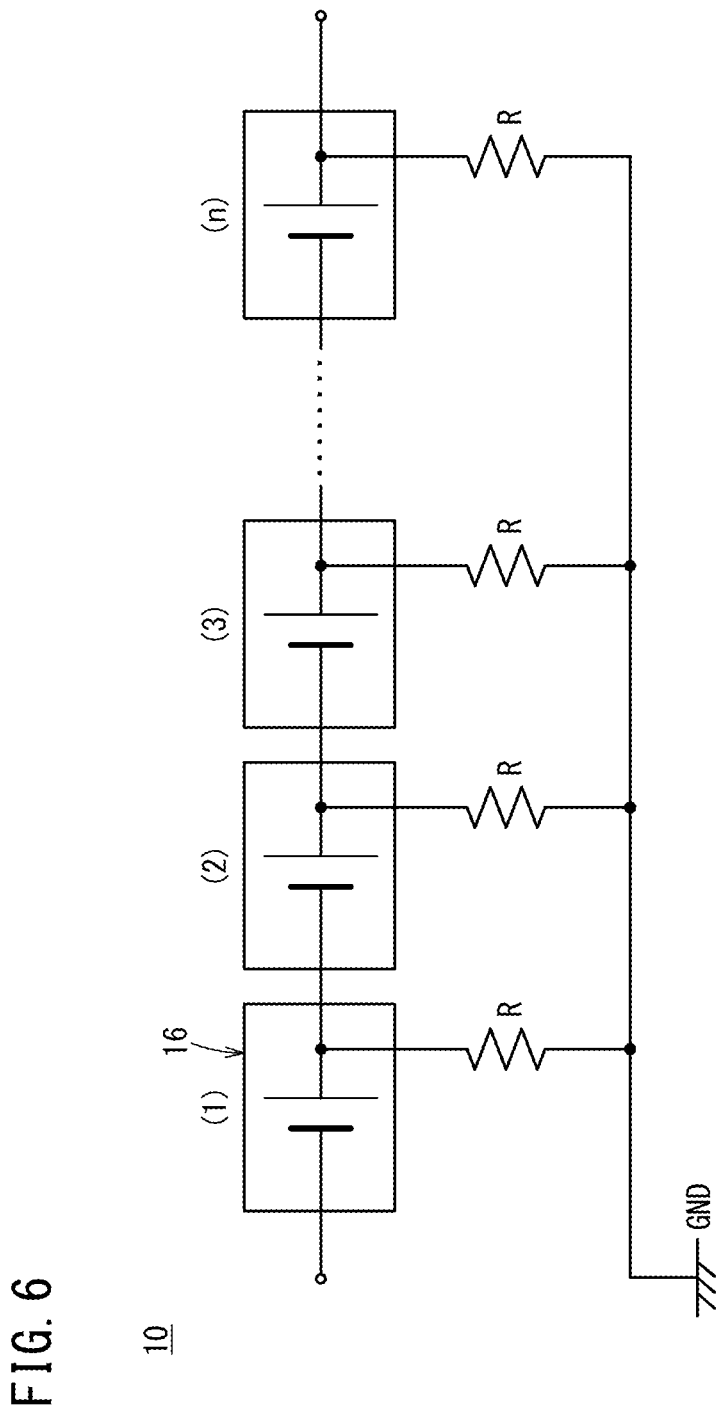
FIG. 6 is an equivalent circuit diagram showing a secondary battery system formed by connecting "n" modules each e.g., having electric power output of A (kW) in series to obtain electric power output of n×A (kW)

For example, it is assumed that "n" modules 16 each, e.g., having electric power output of A (kW) are connected in series to form the secondary battery system 10 having the electric power output of n×A (kW). In this case, each of the frames 20 (see FIG. 1) is connected to the earth (ground: GND). Therefore, as shown in FIG. 6, as the equivalent circuit, "n" insulation resistances R are connected in parallel between the respective modules 16 and the earth GND. The insulation resistance Rg of the entire secondary battery system 10 is the combined resistance of "n" insulating resistors R connected in parallel. Therefore, Rg=R/n. As described above, the insulation resistance Rg of the entire secondary battery system 10 is required to have 0.4 MΩ or more. The insulation resistance R for each unit of the module 16 can be calculated as R≥Z (n×Rg). For example, in the case where the number "n" is 40, the insulation resistance R for each unit of the module 16 is required to have 0.4 MΩ×40=16 MΩ or more.

Further, in the case of constructing the secondary battery system 10 in the electric power scale which is larger than that of the case described above, it is required to increase the number "n" of the modules 16. For example, in the case where the number "n"=80, the insulation resistance R for each unit of the module 16 is required to have 0.4 MΩ×80=32 MΩ or more.

In this regard, it may be considered to increase the number of mica sheets 47 provided between the battery assembly 42 and the box body 22, and increase the thickness of the mica sheet 47. However, in this case, the size of the container, in particular, the height of the housing 14, is increased, and cracks tend to occur easily in the mica sheet 47 during operation undesirably.

Figure 7:
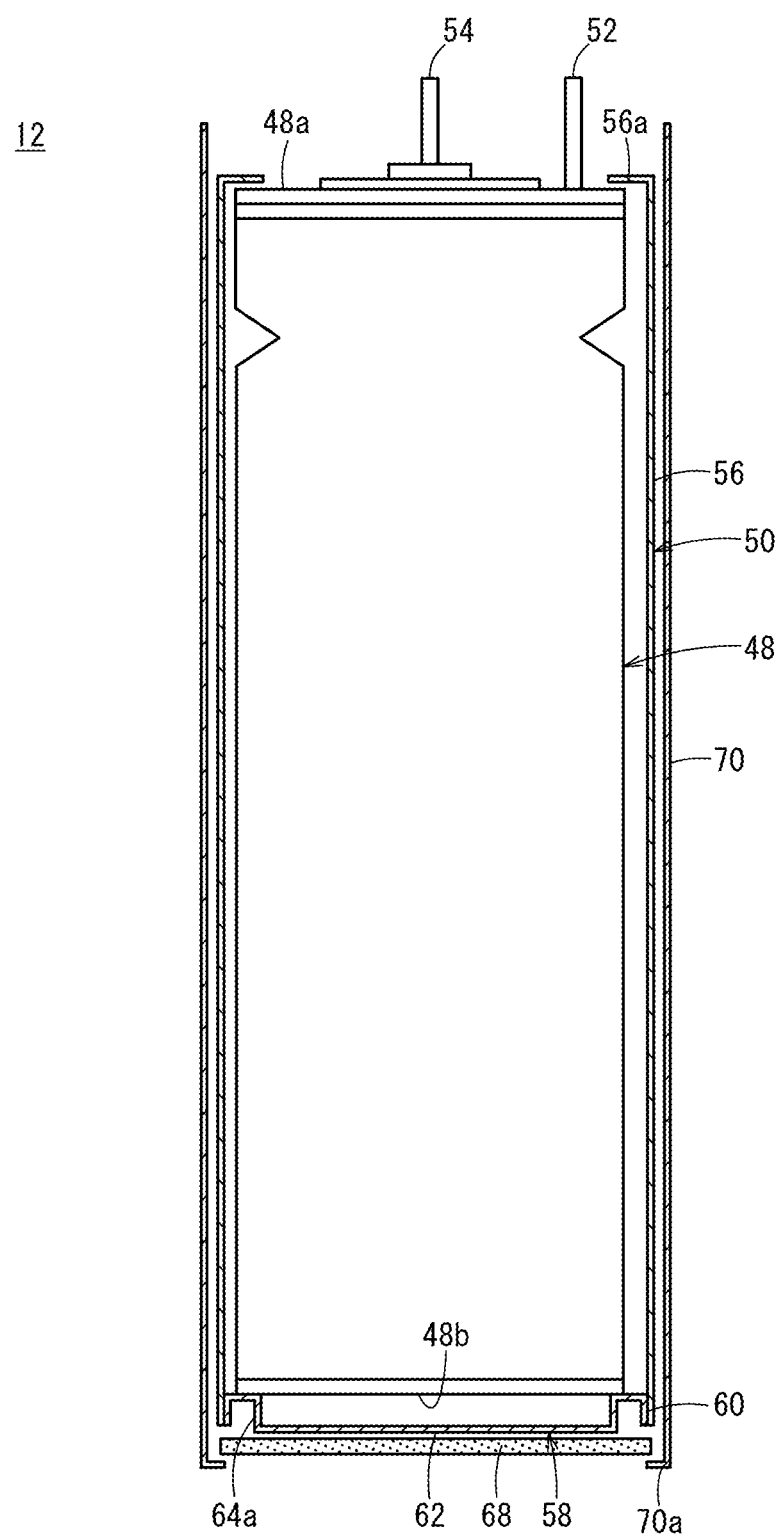
FIG. 7 is a view showing structure of a battery cell according to a reference example, with a cover member, an insulating plate, and an insulating member taken away.
Figure 8A:
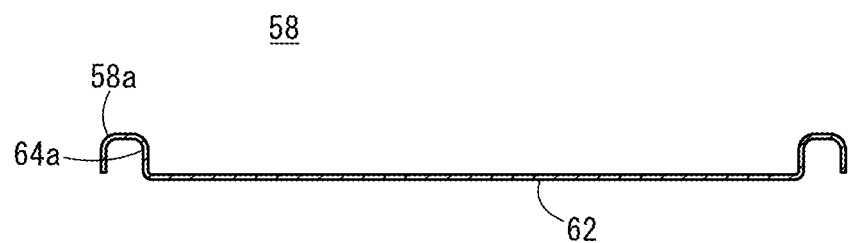
FIG. 8A is a cross sectional view showing a bottom of a cover member according to a reference example.
Figure 8B:
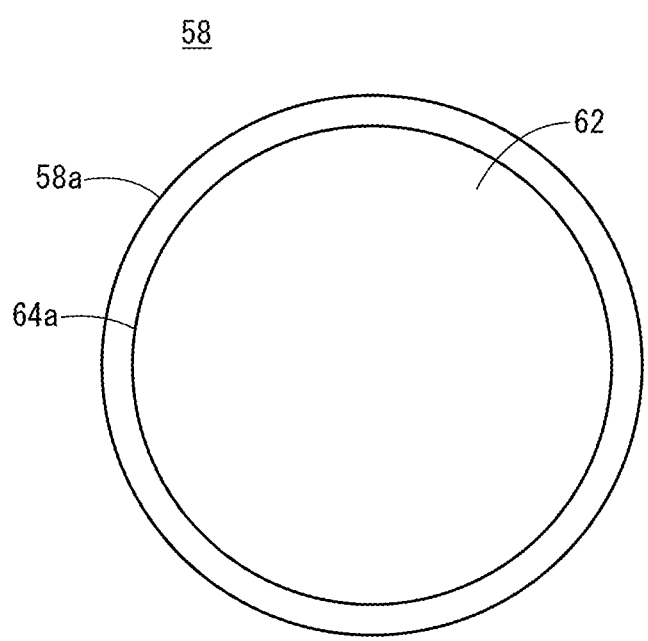
FIG. 8B is a plan view showing the bottom of the cover member, as viewed from a top surface.

In an attempt to address the problem, in the embodiment of the present invention, at least one protrusion 66 is provided in the surface of the expansion 62 facing the bottom surface 48b of the battery body 48. In the structure, the portion of the expansion 62 which contacts the insulating plate 68 is not the entire end surface of the expansion 62 (surface facing the insulating plate 68), but a small area, i.e., the end surface of the protrusion 66 (surface facing the insulating plate 68). In the case where no protrusion 66 is provided in the expansion 62 (reference example), as shown in FIGS. 7, 8A, and 8B, the portion which contacts the insulating plate 68 is the entire end surface of the extension 62.

Both of the embodiment of the present invention and the reference example satisfy the following relationship:

$$Aa > Ab$$

where Aa denotes a projection area of the battery body 48 projected on the bottom surface 22a of the box body 22 (equal to the area of the bottom surface of the battery body 48) and Ab denotes the contact area between the cover member 50 of the battery cell 12 and the insulating plate 68.

Upon comparing the contact resistance (electrical resistance) between the expansion 62 and the insulating plate 68 in the embodiment of the present invention with the reference example, it is notable that there is an increase in the contact resistance resulting from the decrease in the contact area, and a decrease in the contact resistance resulting from the increase in the load per unit area. However, since the increase in the contact resistance resulting from the decrease in the contact area is larger than the decrease in the contact resistance resulting from the increase in the load, all things considered, the above described contact resistance in the embodiment of the present invention is larger than that of the reference example.

Members for electrical insulation provided between the battery assembly 42 and the bottom surface 22a of the box body 22 include the insulating plate 68 which contacts the expansion 62 of the battery cell 12, and the mica sheet 47. The insulation resistances of the insulating plate 68 and the mica sheet 47 can be regarded to have fixed values, respectively, regardless of the extent of the contact area between the expansion 62 and the insulating plate 68.

As described above, since the contact resistance of each battery cell 12 is large in comparison with the case of the reference example, in the case where the contact resistance is considered over the entire module 16, the insulation resistance of the module 16 containing the battery cells 12 according to the embodiment of the present invention is large in comparison with the insulation resistance of the module 16 containing the battery cells of the reference example.

That is, in the embodiment of the present invention, it is possible to improve the insulation resistance of each battery cell 12, increase the insulation resistance of each module 16 without increasing the number and the thickness of insulating sheets such as the mica sheets 47, and increase the number of modules 16 connected to the secondary battery system 10.

Further, the insulating plate 68 directly contacts the end surface of the protrusion 66 provided in the expansion 62, and the expansion 62 functions as a buffer member (suspension member). Therefore, even if vibrations occur in the frame 20 or the box body 22, almost all the vibrations are cancelled at the expansion 62, and are not directly transmitted to the battery cell 12. Consequently, improvement in the reliability of the secondary battery such as the battery cell 12 is achieved.

Since the contact area between the expansion 62 and the insulating plate 68 becomes small, the stress applied to the insulating plate 68 is increased. However, the stress is dispersed in the insulating plate 68. The stress is applied to the mica sheet 47, etc. at the lower position not as the concentrated load, but as the distributed load. Therefore, breakage (cracks) does not occur easily in the mica sheet 47.

Next, several modified examples of the secondary battery according to the embodiment of the present invention, in particular, modified examples of the bottom 58 of the cover member 50, will be described with reference to FIG. 9A to FIG. 12B.

Figure 9A:
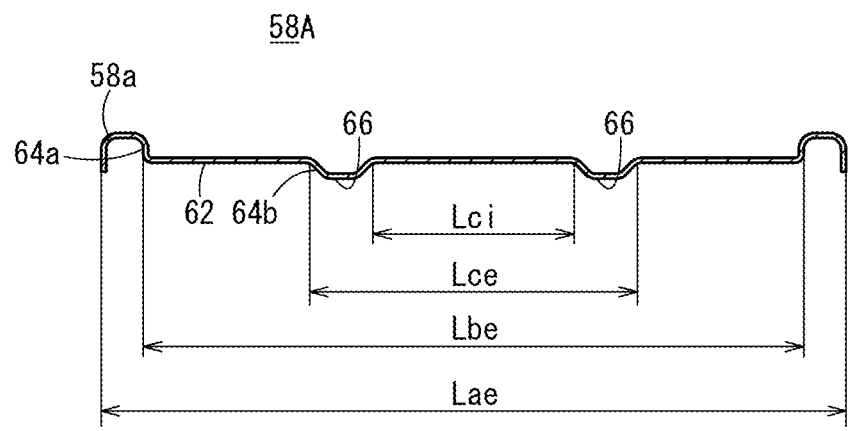
FIG. 9A is a cross sectional view showing a bottom of a cover member according to a first modified example.
Figure 9B:
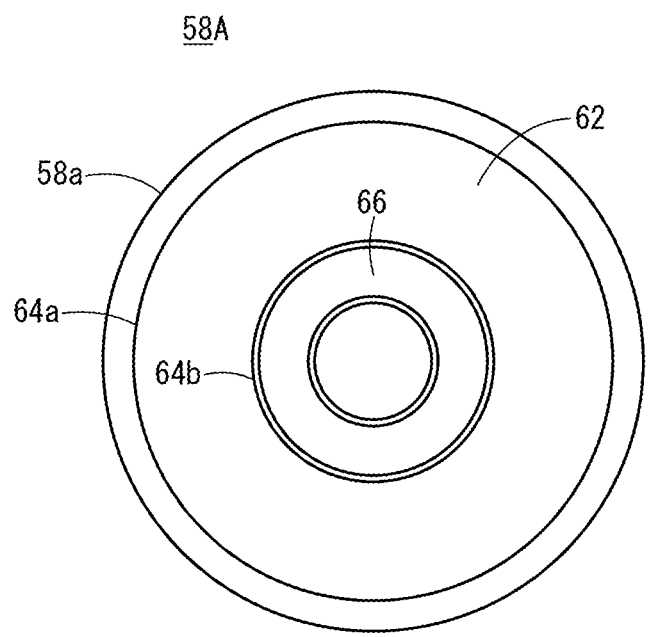
FIG. 9B is a plan view showing the bottom of the cover member, as viewed from a top surface.

As shown in FIGS. 9A and 9B, a bottom 58A of a cover member 50 according to a first modified example has substantially the same structure as the structure of the bottom 58 of the cover member 50 according to the embodiment of the present invention. However, an annular protrusion 66 is provided in the bottom 58A of the cover member 50. In this respect, the bottom 58A of the cover member 50 according to the first modified example is different from the bottom 58 of the cover member 50 according to the embodiment of the present invention. The ratio of the outer diameter Lce of the protrusion 66 to the outer diameter Lbe of the expansion 62 (Lce/Lbe) is, e.g., in a range of 3.5/8 to 4.5/8. The ratio of the inner diameter Lci of the protrusion 66 to the outer diameter Lbe of the expansion 62 (Lci/Lbe) is, e.g., in a range of 2.5/8 to 3.5/8. In this case, since the load is applied through the annular protrusion 66 to the insulating plate 68, stress is dispersed more widely in the insulating plate 68 instead of concentrating at a particular spot, and occurrence of breakage (cracks) in the mica sheet 47 is suppressed to a greater extent.

Figure 10A:
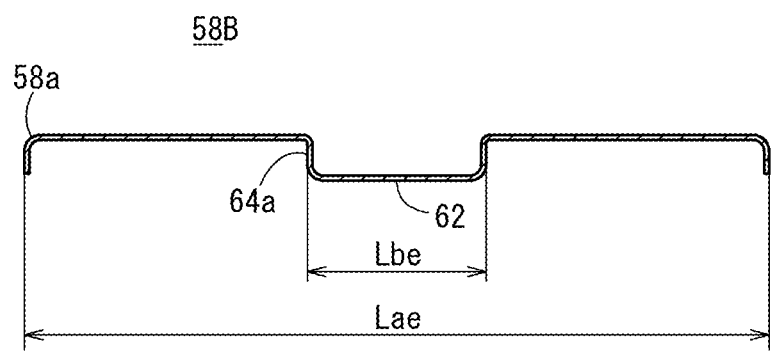
FIG. 10A is a cross sectional view showing a bottom of a cover member according to a second modified example.
Figure 10B:
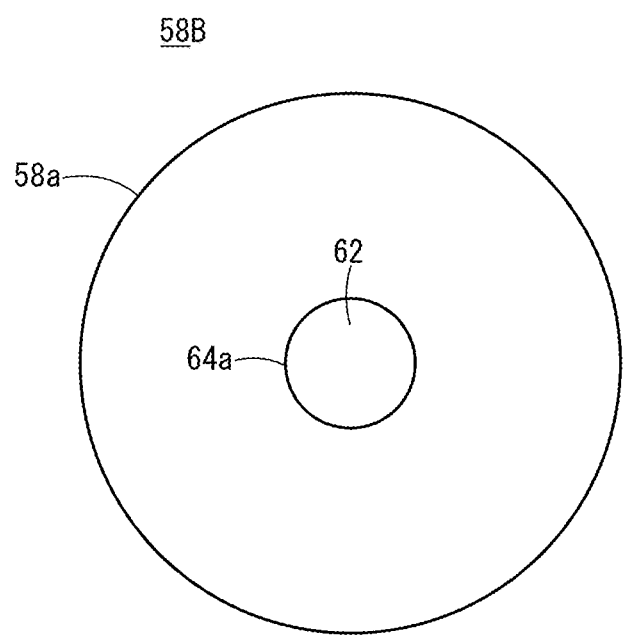
FIG. 10B is a plan view showing the bottom of the cover member, as viewed from a top surface.

As shown in FIGS. 10A and 10B, no protrusion 66 is present in a bottom 58B of a cover member 50 according to a second modified example. In this respect, the bottom 58B of the cover member 50 according to the second modified example is different from the bottom 58 of the cover member 50 according to the embodiment of the present invention.

The ratio of the outer diameter Lbe of the expansion 62 to the outer diameter Lae of the bottom 58B (Lbe/Lae) is, e.g., in a range of 1.5/9 to 2.5/9.

Figure 11A:
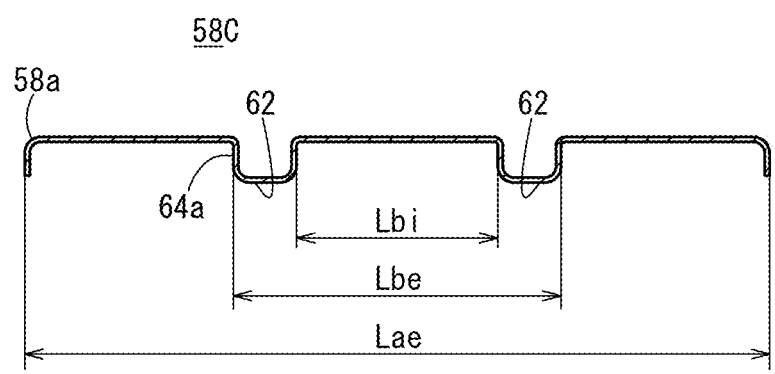
FIG. 11A is a cross sectional view showing a bottom of a cover member according to a third modified example.
Figure 11B:
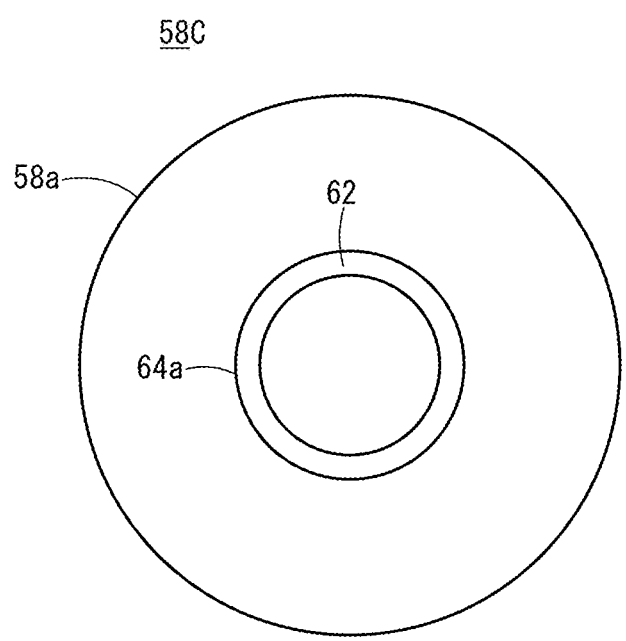
FIG. 11B is a plan view showing the bottom of the cover member, as viewed from a top surface.

As shown in FIGS. 11A and 11B, a bottom 58C of a cover member 50 according to a third modified example has substantially the same structure as the structure of the bottom 58B of the cover member 50 according to the second modified example. However, the expansion 62 has an annular shape. In this respect, the bottom 58C of the cover member 50 according to the third modified example is different from the bottom 58B of the cover member 50 according to the second modified example. The ratio of the outer diameter Lbe of the expansion 62 to the outer diameter Lae of the bottom 58C (Lbe/Lae) is, e.g., in a range of 3.5/9 to 4.5/9, and the ratio of the inner diameter Lbi of the expansion 62 to the outer diameter Lae of the bottom 58C (Lbi/Lae) is, e.g., in a range of 2.5/9 to 3.5/9.

Figure 12A:
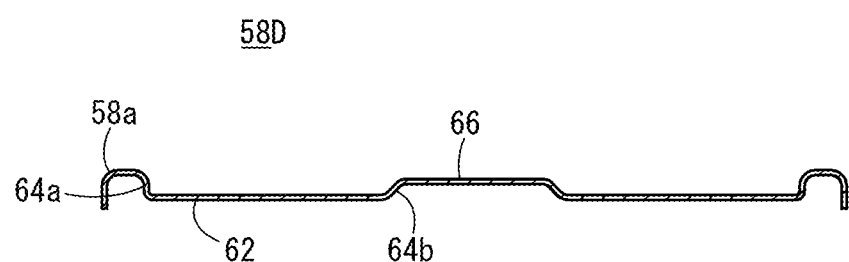
FIG. 12A is a cross sectional view showing a bottom of a cover member according to a fourth modified example.

As shown in FIG. 12A, a bottom 58D of a cover member 50 according to a fourth embodiment has substantially the same structure as the structure of the bottom 58 of the cover member 50 according to the embodiment of the present invention. However, the protrusion 66 (second step 64b) protrudes in a direction opposite to the direction in which the expansion 62 is expanded. In this respect, the bottom 58D of the cover member 50 according to the fourth embodiment is different from the bottom 58 of the cover member 50 according to the embodiment of the present invention.

Figure 12B:
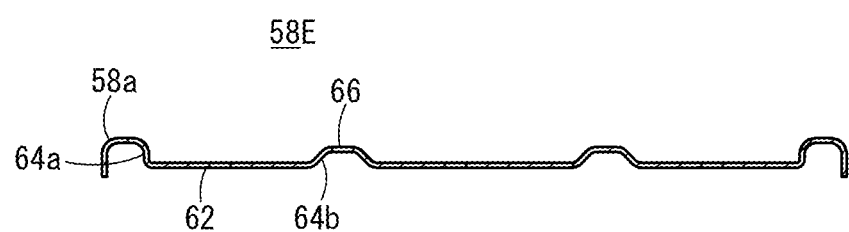
FIG. 12B is a cross sectional view showing a bottom of a cover member according to a fifth modified example.

As shown in FIG. 12B, a bottom 58E of a cover member 50 according to a fifth modified example has substantially the same structure as the structure of the bottom 58A of the cover member 50 according to the first modified example. However, the protrusion 66 (second step 64b) protrudes in a direction opposite to the direction in which the expansion 62 is expanded. In this respect, the bottom 58E of the cover member 50 according to the fifth embodiment is different from the bottom 58A of the cover member 50 according to the first modified example.

Next, modified examples of the secondary battery according to the embodiment of the present invention will be described with reference to FIG. 13A to 17B.

Figure 13B:
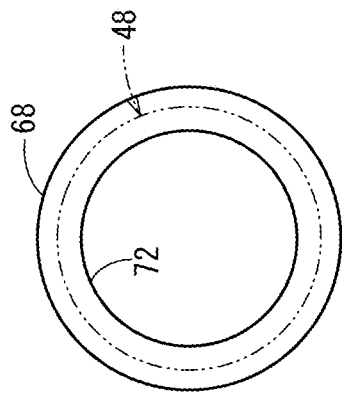
FIG. 13B is a plan view showing the insulating plate (having a ring shape), as viewed from a top surface.
Figure 13A:
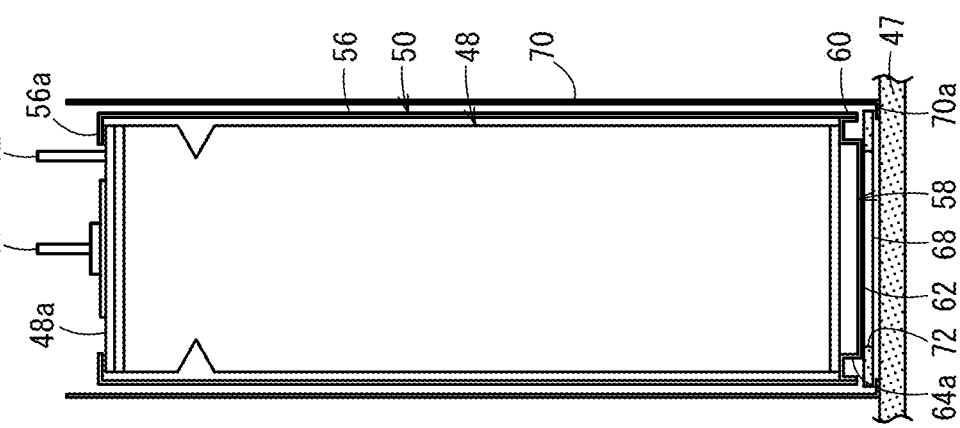
FIG. 13A is a view showing structure of a secondary battery according to a first modified example, with a cover member, an insulating plate, and an insulating member taken away.

As shown in FIG. 13A, a secondary battery according to a first modified example has substantially the same structure as the secondary battery as the embodiment of the present invention described above. However, the secondary battery according to the first modified example is different from the secondary battery according to the embodiment of the present invention in the point below.

Specifically, no protrusion 66 (see FIG. 4) is present in the expansion 62 of the cover member 50, same as the structure of the cover member 50 (see FIGS. 7 to 8B) according to the reference example.

As shown in FIG. 13B, one through hole 72 is formed in a central part of the insulating plate 68 which contacts the cover member 50 and has a ring shape as a whole.

Also in this case, the following size relationship is satisfied:

$$Aa > Ab$$

where Aa denotes a projection area of the battery body 48 projected on the bottom surface 22a of the box body 22 and Ab denotes the contact area between the cover member 50 of the battery cell 12 and the insulating plate 68.

Figure 14B:
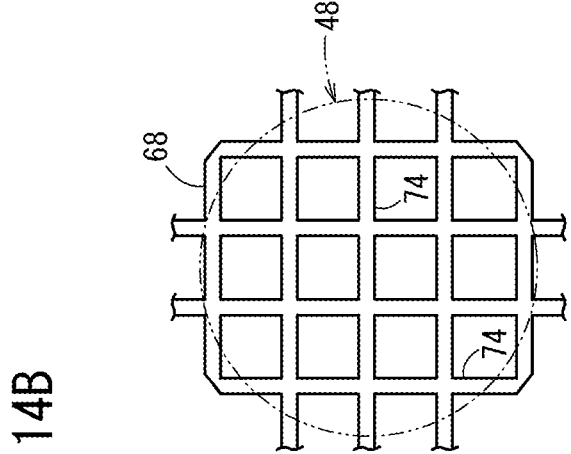
FIG. 14B is a plan view showing an insulating plate (in a grid pattern), as viewed from a top surface.
Figure 14A:
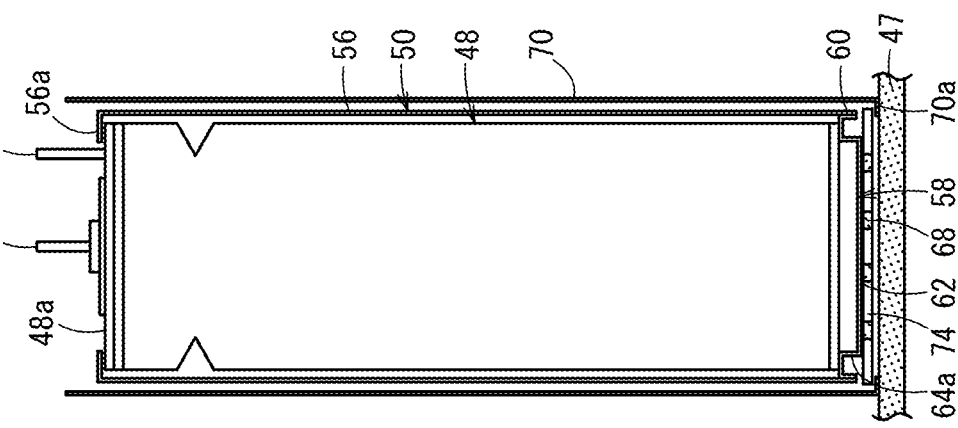
FIG. 14A is a view showing structure of a secondary battery according to a second modified example, with a cover member, an insulating plate, and an insulating member taken away.

As shown in FIGS. 14A and 14B, a secondary battery according to a second modified example has substantially the same structure as the secondary battery according to the above described first modified example. However, the secondary battery according to the second modified example is different from the secondary battery according to the above described first modified example in the point below.

Specifically, the insulating plate 68 has a large number of through holes 74 forming a matrix pattern and has a grid pattern as a whole. In an example of FIG. 14B, a large number of rectangular through holes 74 are formed in a matrix pattern.

Figure 15B:
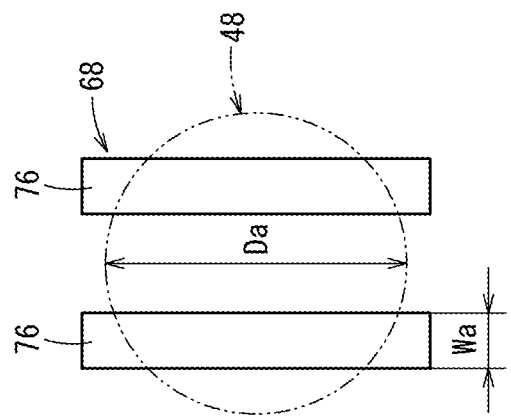
FIG. 15B is a plan view showing an insulating plate (having a band shape), as viewed from a top surface.
Figure 15A:
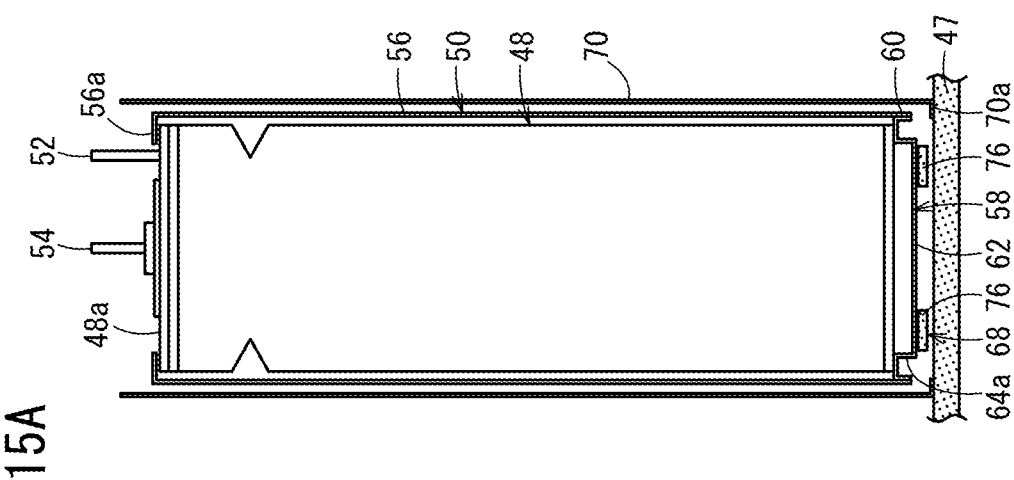
FIG. 15A is a view showing structure of a secondary battery according to a third modified example, with a cover member, an insulating plate, and an insulating member taken away.

As shown in FIGS. 15A and 15B, a secondary battery according to a third modified example has substantially the same structure as the secondary battery according to the above described first modified example. However, the secondary battery according to the third modified example is different from the secondary battery according to the above described first modified example in the point below.

Specifically, the insulating plate 68 is formed by arranging a plurality of band shaped sheets 76 each having a width Wa which is smaller than the outer diameter Da of the battery body 48. In the example of FIG. 15B, two sheets 76 are arranged substantially in parallel.

Also in the second modified example and the third modified example, the following size relationship is satisfied:

$$Aa > Ab$$

where Aa denotes a projection area of the battery body 48 projected on the bottom surface 22a of the box body 22 and Ab denotes the contact area between the cover member 50 of the battery cell 12 and the insulating plate 68.

As shown in FIGS. 16A and 16B, a secondary battery according to a fourth modified example has substantially the same structure as the secondary battery according to the above described embodiment of the present invention. However, the secondary battery according to the fourth modified example is different from the secondary battery according to the embodiment of the present invention in the point below.

Specifically, no protrusion 66 is present in the expansion 62 of the cover member 50, and has the same structure as the cover member 50 (see FIGS. 7 and 8B) according to the reference example.

Among the plurality of insulating sheets, as shown in FIG. 16B, for example, the mica sheet 47 stacked below the insulating plate 68 has a plurality of through holes 78 arranged in a matrix pattern to form a grid pattern as a whole.

In this case, the following relationship is satisfied:

$$Aa > Ac$$

where Aa denotes a projection area of the battery body 48 projected on the bottom surface 22a of the box body 22 and Ac denotes the contact area between the insulating plate 68 and the mica sheet 47 in the projection area. In this case, the contact resistance between the insulating plate 68 and the mica sheet 47 is increased by the decrease in the contact area between the insulating plate 68 and the mica sheet 47. Therefore, the contact resistance of each battery cell 12 is increased. Consequently, it is possible to improve the insulation resistance of each battery cell 12, and increase the insulation resistance of each module 16 without increasing the number and the thickness of the insulating members such as the mica sheets 47, and increase the number of modules 16 connected to the secondary battery system 10.

As shown in FIGS. 17A and 17B, a secondary battery according to a fifth modified example has substantially the same structure as the secondary battery according to the above fourth modified example. However, the secondary battery according to the fifth modified example is different from the secondary battery according to the above fourth modified example in the point below.

Specifically, the mica sheet 47 is formed by arranging a plurality of band shaped sheets 80 each having a width Wb which is smaller than the outer diameter Da of the battery body 48. In the example of FIG. 17B, two sheets 80 are arranged substantially in parallel for each battery body 48.

Also in the fifth modified example, the following size relationship is satisfied:

Aa>Ac where Aa denotes a projection area of the battery body 48 projected on the bottom surface 22a of the box body 22 and Ac denotes the contact area between the insulating sheets in the projection area.

In the above first to fifth modified examples, although the present invention has been described mainly in connection with the case where no protrusion 66 is present in the expansion 62 of the cover member 50, it is a matter of course that the present invention can be adopted suitably in the cover member 50 where the protrusion 66 is formed in the expansion 62. In this case, further increase in the insulation resistance can be achieved.

It is a matter of course that the secondary battery according to the present invention is not limited to the embodiment described above, and various structures can be adopted without deviating from the gist of the present invention.

What is claimed is:

1. A secondary battery comprising:
   a metal container;
   a plurality of insulating sheets stacked on a bottom surface of the container; and
   a battery cell placed on the plurality of insulating sheets, wherein at least one of the following relationships is satisfied:

Aa>Ab

Aa>Ac where Aa denotes a projection area of the battery cell projected on the bottom surface of the container, Ab denotes a contact area Ab between the battery cell and the plurality of insulating sheets, and Ac denotes a contact area between the plurality of insulating sheets in the projection area.

2. The secondary battery according to claim 1, wherein the battery cell includes a tubular battery body and a cover member containing the battery body;
   the cover member includes
      a tubular body at least covering a side surface of the battery body and
      a bottom which at least part of a bottom surface of the battery body contacts; and
   the bottom contacts, among the plurality of insulating sheets, an insulating sheet in an uppermost layer separated for each battery cell.

3. The secondary battery according to claim 2, wherein the bottom includes an expansion expanded in a direction away from the bottom surface of the battery body, and an end surface of the expansion contacts the insulating sheet in the uppermost layer; and
   an area of the end surface of the expansion is smaller than an area of the bottom surface of the battery body.

4. The secondary battery according to claim 3, wherein at least one step is formed in a surface of the expansion facing the bottom surface of the battery body.

5. The secondary battery according to claim 4, wherein the step extends in a direction in which the expansion is expanded.

6. The secondary battery according to claim 4, wherein the step extends in a direction opposite to the direction in which the expansion is expanded.

7. The secondary battery according to claim 3, wherein at least one protrusion is formed in a surface of the expansion facing the bottom surface of the battery body.

8. The secondary battery according to claim 7, wherein the protrusion protrudes in a direction in which the expansion is expanded.

9. The secondary battery according to claim 7, wherein the protrusion protrudes in a direction opposite to the direction in which the expansion is expanded.

10. The secondary battery according to claim 3, wherein the cover member includes a joint portion at which the tubular body and the bottom are joined together, the joint portion extending in an axial direction of the battery body away from the bottom surface of the battery body,
    and wherein the end surface of the joint portion is present between a position corresponding to the bottom surface of the battery body and a position corresponding to the end surface of the expansion.

11. The secondary battery according to claim 10, wherein an outer shape of the insulating sheet in the uppermost layer which contacts the end surface of the expansion substantially matches an outer shape of the end surface of the joint portion.

12. The secondary battery according to claim 3, comprising, in addition to the insulating sheet in the uppermost layer which contacts the end surface of the expansion,
    a tubular insulating member covering the tubular body of the cover member and an outer circumferential portion of the insulating sheet.

13. The secondary battery according to claim 12, wherein a lower end of the tubular insulating member is bent inward at a lower position of the insulating sheet in the uppermost layer, and the inner diameter at the lower end of the tubular insulating member is smaller than an outer diameter of the insulating sheet.

14. The secondary battery according to claim 2, wherein the insulating sheet in the uppermost layer has one or more through holes.

15. The secondary battery according to claim 2, wherein the insulating sheet in the uppermost layer is formed by arranging a plurality of band shaped sheets each having a width smaller than an outer diameter of the battery cell.

16. The secondary battery according to claim 2, wherein at least one insulating sheet which is present below the insulating sheet in the uppermost layer, among the plurality of insulating sheets, has a plurality of through holes.

17. The secondary battery according to claim 2, wherein at least one insulating sheet which is present below the insulating sheet in the uppermost layer, among the plurality of insulating sheets, is formed by arranging a plurality of band shaped sheets each having a width smaller than an outer diameter of the battery cell.

* * * * *